Feb. 28, 1939. C. T. WALTER 2,148,884
METHOD FOR FORMING SYNTHETIC SAUSAGE CASINGS
Original Filed June 5, 1935 2 Sheets-Sheet 1

WITNESS-
Wm. C. Meiser

Charles T. Walter
INVENTOR

BY
ATTORNEY

Feb. 28, 1939.   C. T. WALTER   2,148,884
METHOD FOR FORMING SYNTHETIC SAUSAGE CASINGS
Original Filed June 5, 1935   2 Sheets-Sheet 2
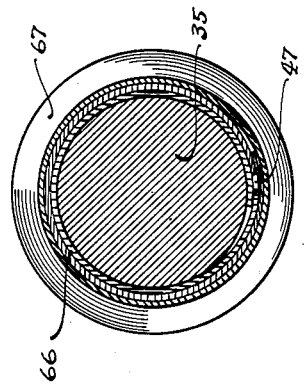
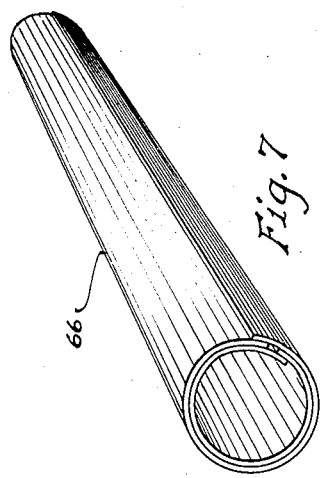
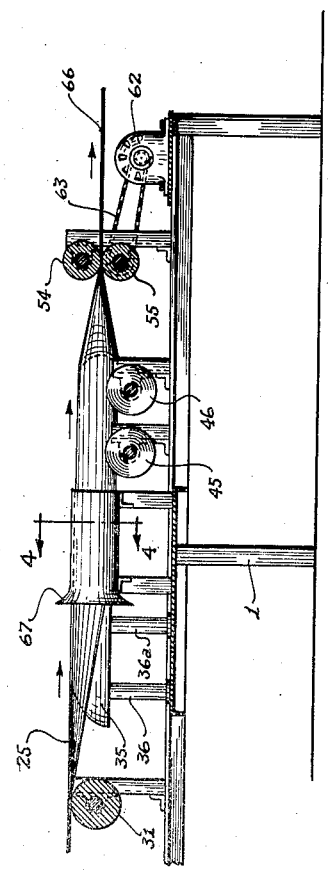
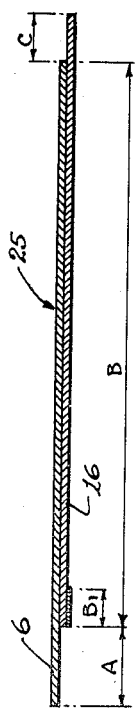
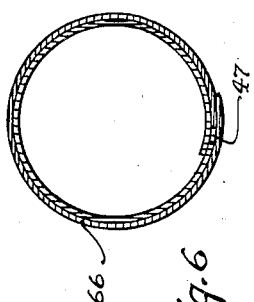
Charles T. Walter
INVENTOR
ATTORNEY Patented Feb. 28, 1939

2,148,884

UNITED STATES PATENT OFFICE 2,148,884

METHOD FOR FORMING SYNTHETIC SAUSAGE CASINGS

Charles T. Walter, Chicago, Ill., assignor to Industrial Patents Corporation, Chicago, Ill., a corporation of Delaware Original application June 5, 1935, Serial No. 25,176. Divided and this application February 25, 1936, Serial No. 65,586

3 Claims. (Cl. 93—94)

This invention relates to a method for forming synthetic sausage casings from sheet cellulose material.

This application is a division of my application entitled, "Method and means for forming synthetic sausage casings," filed June 5, 1935, Serial No. 25,176, which issued June 15, 1937 as Patent No. 2,083,969.

One of the objects of the invention is to provide a method for the formation of synthetic sausage casings from sheet cellulose material.

Another object of the invention is to provide a method for forming a laminated tube from sheet material in a continuous manner.

Other objects of the invention will be apparent from the description and claims which follow.

In the accompanying drawings similar reference characters in the several figures indicate similar parts.

Figure 3 is a side view partly in section of a modified form of the apparatus.

Figure 4 is a cross sectional view of the forming horn and mandrel taken on line 4—4 of Figure 3.

Figure 5 is a sectional view of the laminated sheet from which the casing is formed taken on line 5—5 of Figure 1.

Figure 6 is a sectional view of the casing after forming taken on the line 6—6 of Figure 1.

Figure 7 is a perspective view of a portion of casing prepared in accordance with the method of the present invention.

Figure 1:
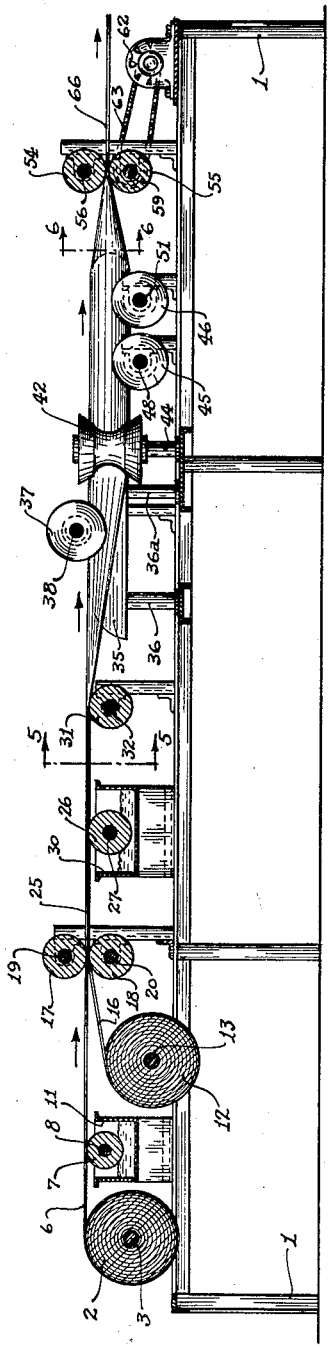
Figure 1 is a sectional view, showing one embodiment of the apparatus which may be employed with the method of the present invention.

Referring now more particularly to Figure 1:

The various elements of the apparatus are mounted upon frame 1. A roll of sheet cellulosic material 2 unwinds from shaft 3, rotatably supported in brackets 4 and 5. As cellulosic sheet 6 is unwound from roll 2 it passes over glue roll 7. Glue roll 7 is mounted on shaft 8 which is rotatably mounted in brackets 9 and 10. Glue roll 7 picks up liquid glue or cement from pan 11 and applies the glue or cement to the under surface of sheet 6 as it is drawn tautly over applicator 7. Roll 12 of sheet cellulose material is wound on shaft 13 which is rotatably mounted on brackets 14 and 15. Sheet cellulose 16, as it is unwound from roll 12, passes between rollers 17 and 18 as does sheet 6. Roller 17 is mounted on shaft 19 and roller 18 is mounted on shaft 20. Shaft 19 is rotatably mounted in brackets 21 and 22 and shaft 20 is rotatably mounted in brackets 23 and 24. Rollers 17 and 18 serve to press sheet 6 and sheet 16 together forming a laminated sheet 25.

Figure 2:
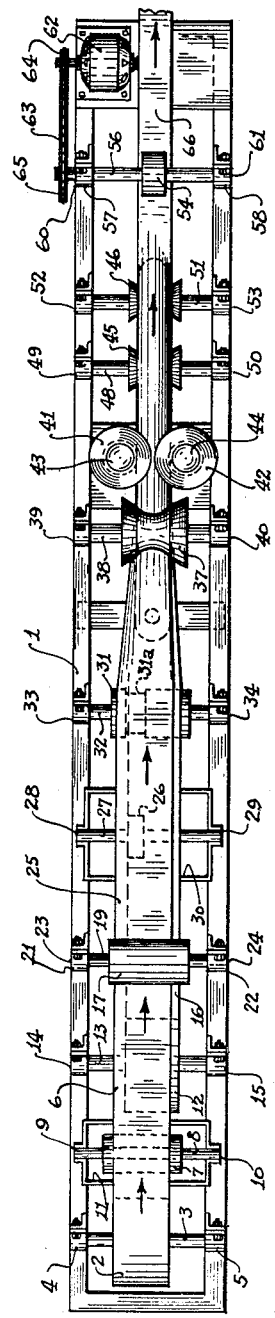
Figure 2 is a plan view of the apparatus shown in Figure 1.

It will be noted by reference to Figure 2 that roll 12 and roll 2 are positioned on respective shafts 13 and 3 such that the laminated sheet 25 formed of sheets 16 and 6 is formed with the laminations offset. This may be clearly seen in Figure 5. This construction, it will be seen by reference to Figure 5, results in the area A of single thickness, area B of double thickness and the area C of single thickness.

Laminated sheet 25 after passing between rollers 17 and 18 which have served to firmly and smoothly form the laminated sheet 25 from sheets 16 and 6 passes over glue applicator roll 26.

It will be noted by reference to Figure 2 that applicator roll 26 is narrow and serves to apply a band $B_1$ of glue or cement upon area B as indicated in Figure 5. Applicator roll 26 may or may not be large enough to apply glue or cement as well to area A. This, however, is unnecessary since area A has already received glue or cement from applicator 7. Applicator roll 26 is mounted on shaft 27 which is rotatably mounted in brackets 28 and 29. Applicator roll 26 picks up glue from glue box 30. After passing over applicator roll 26 laminated sheet 25 passes over tensioning roll 31. Tensioning roll 31 is mounted upon shaft 32 which is rotatably mounted in brackets 33 and 34. It will be noted that roll 31 is provided with groove 31a to avoid contact with area $B_1$. In the form of the apparatus shown in Figures 1 and 2 sheet 25 is then fed over mandrel 35 supported by risers 36 and 36a.

Sheet 25, which is, of course, moving in the direction of the arrows, is pressed downwardly by forming spindle 37. Spindle 37 is rotatably mounted on shaft 38 which is mounted in brackets 39 and 40. Side spindles 41 and 42 serve to complete the forming of the cylindrical tube. Spindle 41 is rotatably mounted on shaft 43 which is rigidly affixed to frame 1. Spindle 42 is rotatably mounted on shaft 44 which is also rigidly affixed to frame 1.

The formed casing then passes over spindles 45 and 46 which serve to seal the joint 47. Spindle 45 is rotatably mounted on shaft 48 which is supported in brackets 49 and 50. Spindle 46 is rotatably mounted on shaft 51 which is supported in brackets 52 and 53. The completed casing is then passed between presser rollers 54 and 55. Roller 54 is mounted on shaft 56 supported in brackets 57 and 58. Roller 55 is mounted on shaft 59 supported in brackets 60 and 61. Presser rollers 54 and 55 are positioned closely in order to provide sufficient friction to draw the material through the apparatus. Rollers 54 and 55 are somewhat narrower than the casing to avoid creasing the casing too sharply at the edges. Roller 55 is driven by motor 62 through chain 63 and sprockets 64 and 65. After passing between rollers 54 and 55 the completed casing 66 may be cut into desired lengths as shown in Figure 7.

In the embodiment of the forming means shown in Figure 3 forming horn 67 is substituted for spindles 37, 41 and 42 and serves a function similar to that served by the spindles.

In carrying out the method of the present invention I prefer to use a cellulosic sheet of substantially pure cellulose, using as glue or cement a solution of cellulose viscose which is later regenerated after the formation of the tube in the manner disclosed in my co-pending application entitled Sausage casings, Serial No. 718,953, filed April 4, 1934, which issued June 2, 1936, as Patent No. 2,042,644.

It will be seen that the method of the present invention results in the formation of a laminated cellulosic casing of great strength, the casing being formed from sheet cellulose in a continuous manner and being provided with a lap joint as may be readily noted in Figure 6.

I claim:

1. The method of forming a synthetic sausage casing which comprises applying adhesive to one surface of a sheet of cellulose, and, with such adhesive bonding another sheet of cellulose thereto in offset relationship whereby each sheet overlaps the other sheet along one edge thereof, applying adhesive to one of the overlaps, and bonding the other overlap thereto to form a seamed tube.

2. The method of forming synthetic sausage casings which comprises applying adhesive to one surface of a sheet of cellulose, bonding another sheet of cellulose thereto in offset relationship whereby the resultant laminated sheet of cellulose comprises three areas consisting of a main portion of two thicknesses and two edge portions of single thickness, applying adhesive near one edge of said laminated sheet, and thereafter forming a lap joint with said edges.

3. The method of forming a synthetic sausage casing which comprises applying adhesive to one surface of a sheet of cellulose, bonding another sheet of cellulose thereto in offset relationship whereby each sheet overlaps the other sheet along one edge thereof, applying adhesive to the overlap of the second sheet and bonding the overlap of each sheet to the surface adjacent the opposite edge of its respective sheet to form a seamed tube.

CHARLES T. WALTER.